Nov. 23, 1943.  A. ROBERTS  2,335,085
VALVE CONSTRUCTION
Filed March 18, 1941  2 Sheets-Sheet 1

INVENTOR
*Arthur Roberts*
BY
*Blair, Curtis + Hayward*
ATTORNEYS

Nov. 23, 1943.  A. ROBERTS  2,335,085
VALVE CONSTRUCTION
Filed March 18, 1941  2 Sheets-Sheet 2

INVENTOR
Arthur Roberts
BY
Blair, Curtis & Hayward
ATTORNEYS

Patented Nov. 23, 1943

2,335,085

UNITED STATES PATENT OFFICE 2,335,085

VALVE CONSTRUCTION

Arthur Roberts, Cleveland Heights, Ohio, assignor to The Colonnade Company, Cleveland, Ohio, a corporation of Ohio Application March 18, 1941, Serial No. 383,905

8 Claims. (Cl. 251—107)

This invention relates to a valve construction and more particularly to a valve construction for controlling the flow of gas to the rings of a multiple-ring gas burner.

One of the objects of this invention is to provide a valve construction which is simple, thoroughly practical, and durable in use. Another object is to provide a construction of the above character which may be quickly and easily operated by the user. Another object is to provide a construction of the above character, the manufacture of which will be economical both from the standpoint of labor and materials used. Another object is to provide a construction of the above character which will be sturdy and well able to withstand hard usage. A further object is to provide a construction of the above character by which the flow of gas to any individual or combination of rings in a multiple-ring gas burner may be controlled. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings in which are shown several of the various possible embodiments of this invention, Figures 1 through 8 are horizontal sections taken through a valve embodying the present invention with the movable parts thereof positioned in different relative positions in each figure;

Figure 9:
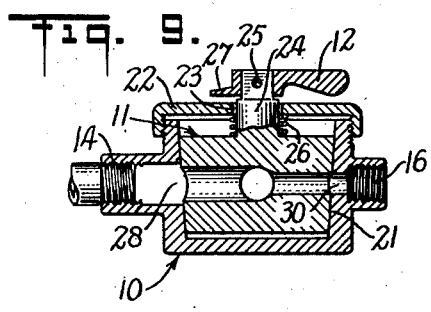
Figure 9 is a vertical section of the valve shown in Figures 1 through 8 taken on the line 9—9 of Figure 2.
Figure 10:
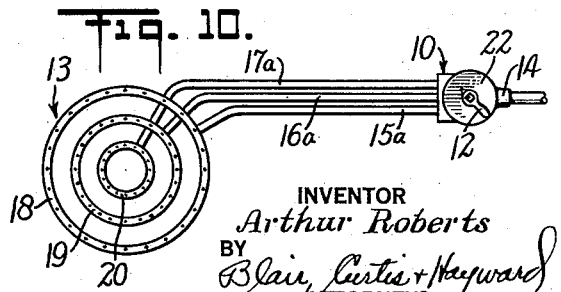
Figure 10 is a diagrammatical plan view of the valve shown in Figures 1 through 9 connected to a multiple-ring gas burner.
Figure 11:
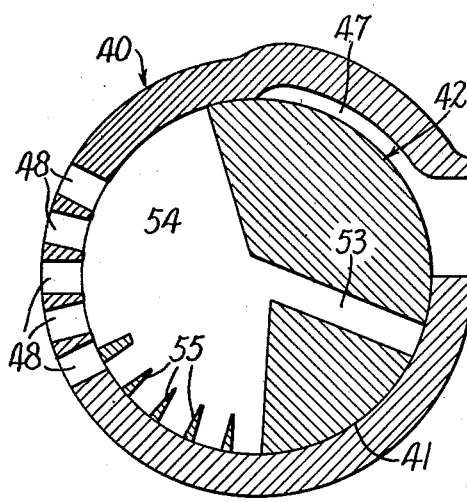
Figure 12:
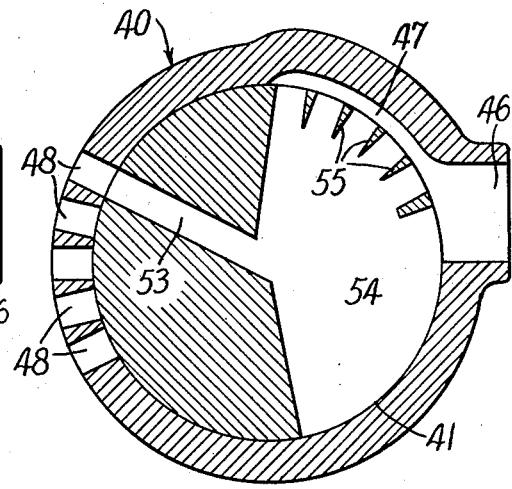
Figure 13:
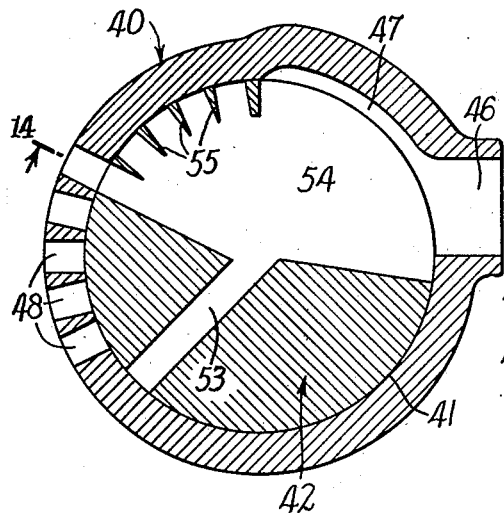
Figure 14:
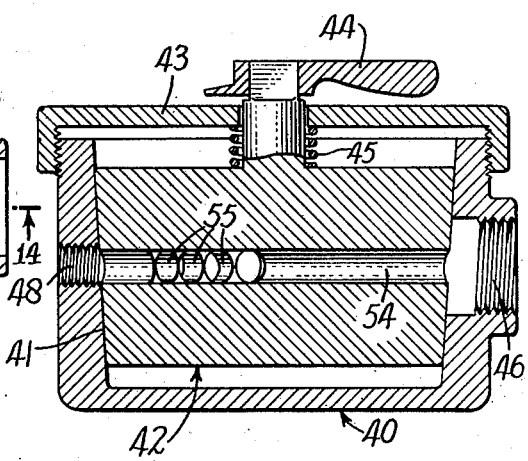

Figures 11, 12 and 13 are horizontal sections of another embodiment of the valve shown in Figures 1 through 10 with the movable parts thereof positioned in different relative positions in each figure; and Figure 14 is a vertical section taken on the line 14—14 of Figure 13.

Similar reference characters refer to similar parts throughout the several views of the drawings.

Figure 7:
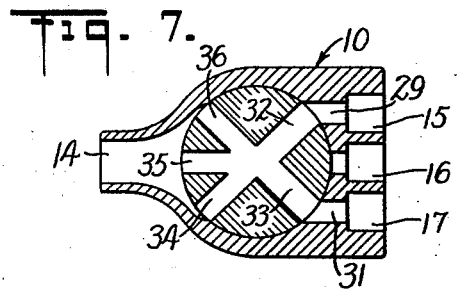
Figure 8:
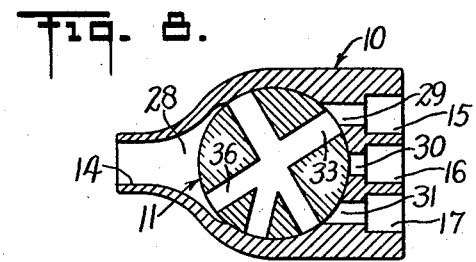

Referring first to Figures 1 through 10, and to Figures 9 and 10 in particular, the valve preferably includes a casing, generally indicated at 10, having a distributor plug, generally indicated at 11 (Figure 9), mounted therein. Plug 11, which controls the flow of gas through the valve, is rotated by means of a handle 12. This valve is particularly adapted for controlling the flow of gas to a three-ring gas burner, generally indicated at 13 (Figure 10), and preferably has one inlet port 14 (Figures 1–8) and three outlet ports 15, 16 and 17. These outlet ports are connected by pipes 15a, 16a and 17a (Figure 10) to the rings 18, 19 and 20, respectively, of burner 13, and by adjusting the distributor plug 11, the flow to each individual or combination of the rings of burner 13 may be controlled, all as will be fully described hereinafter.

Referring now to Figures 8 and 9, casing 10 has a circular hole 21 extending downwardly therein. The side wall of this hole tapers inwardly forming a seat for the tapered side wall of distributor plug 11. Thus, the side walls of hole 21 provide a bearing for plug 11, permitting rotation of the plug within the hole. The open end of hole 21 is covered by a cap 22 which preferably screws onto casing 10. This cap has a hole 23 in its center through which the stem 24 of plug 11 extends. A handle 12 is secured to the upper end of stem 24 in any suitable manner, such as by a pin 25. A spring is mounted on the stem and extends between cap 22 and the upper surface of plug 11. This spring exerts a resilient pressure between the cap and the plug to resiliently press the plug downwardly into tapered hole 21. Handle 12 is provided with a finger 27 which, when used in conjunction with markings (not shown) on the top of cap 22, enables the user of the valve to set the distributor plug in any desired position.

As pointed out hereinabove, casing 10 is provided with an inlet port 14 and three outlet ports 15, 16 and 17. All of these ports are preferably internally threaded to permit the attachment of the main gas supply to inlet port 14 and the connection of each of ports 15, 16 and 17 to a ring of the burner. Referring to Figures 8 and 9, the mouths 28, 29, 30 and 31 of the ports opening into hole 21 lie in a horizontal plane and are positioned substantially in the center of the side wall of hole 21. The mouth 28 of inlet port 14 is enlarged so that it extends around the side walls in both directions a substantial distance (Figures 1 through 8), and the mouths of port 14 and ports 15, 16 and 17 are positioned on opposite sides of casing 10.

Figure 3:
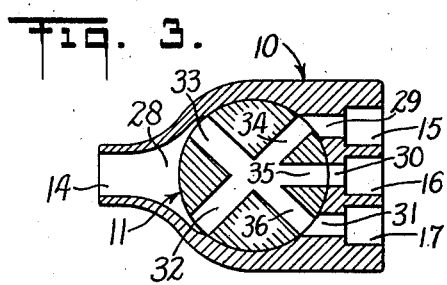

To connect the mouths of the inlet and outlet ports, a series of passages is provided in distributor plug 11. These passages extend through plug 11 in a horizontal plane and are so positioned within the plug that when the plug is seated in hole 21, the ends of these passages may be aligned with the mouths of the inlet and outlet ports. Referring to Figure 3, these passages extend radially from the center of plug 11, at which point they all intersect. The outer ends of these passages are positioned so that when plug 11 is in the position shown in Figure 3, passages 34, 35 and 36 open into the mouths of ports 15, 16 and 17, respectively, and the outer ends of passages 32 and 33 are positioned at the outer ends of the enlarged mouth 28 of inlet port 14. For purposes to be disclosed more fully hereinafter, passages 32 and 33 are preferably of greater diameter than passages 34, 35 and 36, and the distance between the mouths of the outlet ports is slightly greater than the diameter of passages 32 and 33.

Figure 1:
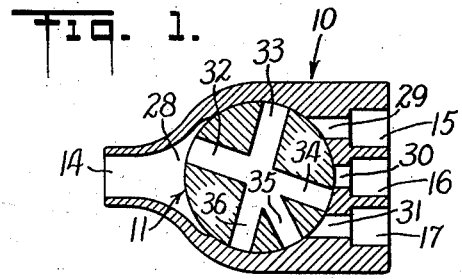
Figure 2:
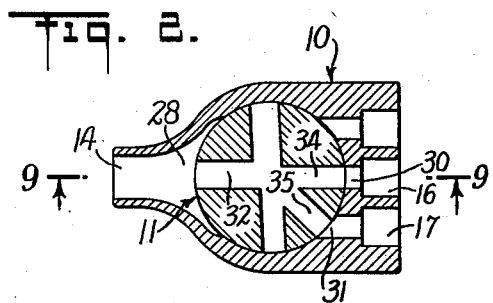

With the passages so positioned, the distributor plug may be set to supply gas to any one or combination of outlet ports and control the amount of gas passing through them. In Figure 1, no passage is connected to the mouth of an outlet port, and thus, when plug 11 is in this position, the valve is "off." By turning the plug in a counterclockwise direction, the ends of passages 34 and 35 are brought across the mouths 30 and 31 of ports 16 and 17 (Figure 2). Gas at this time enters the plug through passage 32, which because of its enlarged size, supplies sufficient gas for both ports 16 and 17. From this and subsequent figures, it may be seen that the size of the opening connecting any passage or passages with the mouth or mouths of the outlet ports may be varied by turning the plug and thus causing the open end of a passage to move across the mouth of an outlet port. Thus, in every case, control of the flow into any single or combination of outlet ports is obtainable.

Figure 4:
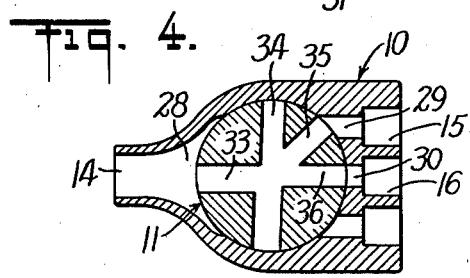
Figure 5:
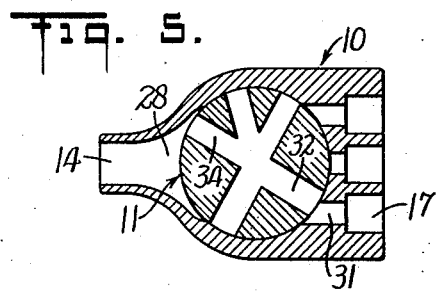
Figure 6:
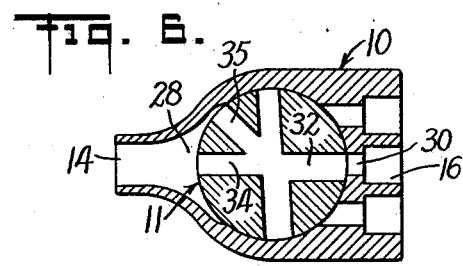

In Figure 3, all of the outlet ports are shown connected to the inlet port, gas entering the plug through both enlarged passages 32 and 33; in Figure 4, the supply is to ports 15 and 16; in Figure 5, to port 17; in Figure 6, to port 16; in Figure 7, to ports 15 and 17; and, in Figure 8, to port 16. Thus, in Figures 2, 3, 4 and 7, every combination of the outlet ports is shown connected to the inlet port, while in Figures 5, 6 and 8, connection of individual outlet ports to the inlet ports is shown. Accordingly, a valve is shown which permits the user not only to select the burner or combination of burners to be used, but also permits him to control the size of the flame on the burner ring or rings selected. Thus, the burner may be set so that it gives off any desired amount of heat.

Referring now to Figures 11, 12, 13 and 14, a valve embodying some of the features of the valve described hereinabove is shown. The basic construction of this valve is substantially similar to the construction of the valve shown in Figure 9. It comprises a casing (Figure 14), generally indicated at 40, having a tapered hole 41 therein in which a plug, generally indicated at 42, is seated. A cap 43 closes the open end of hole 41, has a hole in the center through which the stem for control handle 44 extends, and holds plug 42 seated in hole 41 by means of a spring 45.

Inlet port 46 has an enlarged mouth 47 which extends a substantial distance around the side wall of hole 41 in a counterclockwise direction, as viewed in Figure 11. The outlet ports 48 are positioned in the same horizontal plane as inlet port 46, and both the inlet port and the outlet ports are preferably internally threaded to permit the connection of the main gas supply pipe and the rings of a multiple-ring gas burner thereto. A single passage 53 extends through plug 42, and at the center of the plug its mouth 54 spreads out through a substantial portion of the plug. One half of mouth 54 is open to the side wall of hole 41, and the other half is divided into five sections by stops 55, which are preferably separated by a distance equal to the width of the mouths of the outlet ports 48.

By turning the valve in a counterclockwise direction from the position shown in Figure 11, passage 53 may be brought into alignment with the mouths of each individual or adjoining pair of outlet ports, gas being supplied to passage 53 through its enlarged mouth 54. Upon continued turning of the valve in a counterclockwise direction, passage 53 is moved beyond the lowermost outlet port, as viewed in Figure 13, and the portion of mouth 54 of passage 53 having stops 55 therein may be connected successively, beginning with the uppermost port, to all of the outlet ports until they are all connected in unison to the inlet port. During this period of adjustment, the mouth 47 of inlet port 46 coacts with the open portion of mouth 54 in the distributor plug to permit gas to flow through the plug to the outlet ports. Also, during this period of adjustment, by turning plug 11 stops 55 are brought across the mouths of the outlet ports and thus may be used to vary the flow of gas therethrough. Thus, in this type of valve construction, gas may be supplied to any individual outlet port, to any adjoining pair of ports, or any number of outlet ports may be successively placed in operation until all are in operation in unison.

It might here be pointed out that certain features of this invention are capable of advantageous use in connection with liquids, but it has particular suitability for and advantages peculiar to the control of gases. Thus, it will be seen that a thoroughly practical and durable valve construction has been disclosed in which the several objects hereinabove mentioned, as well as many others, have been successfully accomplished.

As many possible embodiments may be made of the above invention, and as many changes might be made in the embodiment above set forth, it is to be understood that all matter hereinbefore set forth, or shown in the accompanying drawings, is to be interpreted as illustrative and not in a limiting sense.

I claim:

1. In apparatus of the nature described, in combination, a casing, a distributor plug rotatably mounted in said casing, an inlet port extending through said casing and positioned on one side of said casing, and three or more ports positioned on the opposite side of and extending through said casing, said distributor plug having a plurality of interconnected passages extending therethrough, one of said passages always being in connection with said inlet port when one of said passages is connected to an outlet port, the size of the opening connecting any passage or passages with an outlet port or ports being variable by rotation of said plug, said passages being capable of connection with each of said outlet ports individually or with any combination of them, the ends of said passages and said outlet ports being so positioned with respect to each other that when said passages are connected to two or more outlet ports the connections to said outlet ports are opened and closed in unison.

2. In apparatus of the nature described, in combination, a casing, a distributor member rotatably mounted in said casing, an inlet port positioned on one side of and extending through said casing, said inlet port having an enlarged mouth, three outlet ports on the opposite side of and extending through said casing, and a plurality of passages extending through said distributor member, one of said passages always being in connection with said inlet port or its mouth when one of said passages is connected to an outlet port, said passages being capable of registration with each of said outlet ports individually or with any combination of them.

3. In apparatus of the nature described, in combination, a casing, a distributor member rotatably mounted in said casing, and inlet port means and three outlet ports positioned on opposite sides of and extending through said casing, said distributor member having a plurality of interconnected passages therein, one of said passages always being in connection with said inlet port means when one of said passages is in connection with an outlet port, said passages being capable of registration with each of said outlet ports individually or with any combination of them, said outlet ports being separated by a distance greater than the diameter of the largest distributor member passage, whereby when said passage or passages are moved into or out of registry with an outlet port or ports, the size of the opening connecting them can be varied between open and closed positions.

4. In apparatus of the nature described, in combination, a casing, a distributor member rotatably mounted in said casing, an inlet port positioned on one side of and extending through said casing, three outlet ports positioned on the opposite side of and extending through said casing, and five interconnected passages formed in said distributor and adapted to be aligned with said ports, three of said passages being capable of registration with said outlet ports while said other passages are connected to said inlet port, at least one of said passages always being in connection with said inlet port when a passage is connected to one of said outlet ports, said passages being capable of registration with any individual or combination of outlet ports.

5. In apparatus of the nature described, in combination, a casing, a distributor member rotatably mounted in said casing, an inlet port positioned on one side of and extending through said casing, three outlet ports positioned on the opposite side of and extending through said casing, five interconnected passages formed in said distributor member and adapted to be aligned with said ports, three of said passages being capable of registration with said outlet ports while said other passages are connected to said inlet port, at least one of said passages always being in connection with said inlet port when a passage is connected to one of said outlet ports, said passages being capable of registration with any individual or combination of outlet ports, said outlet ports being separated by a distance greater than the diameter of the largest distributor member passage, whereby as said passage or passages are moved into or out of registration with said port or ports, the size of the opening connecting them can be varied between open and closed positions.

6. In apparatus of the nature described, in combination, a casing, a distributor member rotatably mounted in said casing, an inlet port positioned on one side of said casing and having an enlarged mouth opening thereinto, three outlet ports positioned on the opposite side of said casing and extending therethrough, and five interconnected passages formed in said distributor member and adapted to be aligned with said ports, three of said passages being capable of registration with said outlet ports while said other passages are connected to the mouth of said inlet port, at least one of said passages always being in connection with said inlet port when a passage is connected to one of said outlet ports, said passages being capable of registration with any individual or combination of outlet ports.

7. In apparatus of the nature described, in combination, a casing and a distributor plug rotatably mounted in said casing, said casing having a primary port and three secondary ports, said secondary ports being positioned substantially opposite to said primary port, said distributor plug having a plurality of interconnected passages extending therethrough for connecting said primary and secondary ports, the size of any passage opening connecting any passage or combination of passages with a secondary port or ports being variable by rotation of said distributor plug, said passages through rotation of said distributor plug being capable of interconnecting said primary port individually with each of said secondary ports or with any combination of said secondary ports, the openings at the ends of said passages and said secondary ports being so positioned with respect to each other that when said passages are connected to two or more secondary ports the connections to said secondary ports are opened and closed in unison.

8. In apparatus of the nature described, in combination, a casing, and a distributor plug rotatably mounted in said casing, said casing having a primary port and three secondary ports, said secondary ports being positioned substantially opposite to said primary port, the openings of said secondary ports into the interior of said casing being positioned in a single plane normal to the vertical axis of said casing, said distributor plug having passage means therein for interconnecting said primary and secondary ports, said passage means having five openings in the side wall of said plug positioned in the same plane as said ports when said plug is mounted in said casing, three of said last mentioned openings being so spaced that they may be registered in unison with said three secondary ports and the other two openings being diametrically positioned across said plug from the two outside openings of said last mentioned three openings whereby said primary port may be connected with any single or combination of secondary ports.

ARTHUR ROBERTS.